United States Patent
Payne et al.

(10) Patent No.: US 12,020,878 B2
(45) Date of Patent: *Jun. 25, 2024

(54) ZERO CROSSING CONTACTOR AND METHOD OF OPERATING

(71) Applicant: GE Aviation Systems Limited, Gloucestershire (GB)

(72) Inventors: Peter Roy Payne, Cheltenham (GB); John Houghton, Cheltenham (GB); Robert Henry Keith Miles Bullock, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,177

(22) Filed: May 16, 2023

(65) Prior Publication Data

US 2023/0290597 A1  Sep. 14, 2023

Related U.S. Application Data

(63) Continuation of application No. 17/509,770, filed on Oct. 25, 2021, now Pat. No. 11,664,180, which is a (Continued)

(30) Foreign Application Priority Data

Apr. 25, 2018 (GB) ...................... 1806782

(51) Int. Cl.
*H01H 47/18* (2006.01)
*B64D 41/00* (2006.01)
(Continued)

(52) U.S. Cl.
CPC ............. *H01H 47/18* (2013.01); *B64D 41/00* (2013.01); *H01H 9/56* (2013.01); *H01H 33/59* (2013.01);
(Continued)

(58) Field of Classification Search
CPC ...... H01H 47/18; H01H 47/002; H01H 47/26; H01H 33/59; H01H 33/593; H01H 9/56;
(Continued)

(56) References Cited

U.S. PATENT DOCUMENTS 5,804,991 A  9/1998  Hu
6,392,390 B1  5/2002  Ito et al.
(Continued)

FOREIGN PATENT DOCUMENTS

CN  1446366 A  10/2003
CN  102804314 A  11/2012
(Continued)

OTHER PUBLICATIONS

Siemens, "Operating Instructions PSD control unit", Aug. 2006, 98 pages.

*Primary Examiner* — Thienvu V Tran
*Assistant Examiner* — Shahzeb K Ahmad
(74) *Attorney, Agent, or Firm* — McGarry Bair PC (57) ABSTRACT

A contactor apparatus and method for operating the contactor apparatus can include a contactor assembly with a contactor coil operably coupled to a contactor switch. One or more sensors can be provided in the contactor assembly adapted to measure one or more aspects of the contactor assembly. Based upon the measured aspects, a controller can initiate operation of the contactor switch to effectively toggle the contactor switch at a zero-crossing point along an alternating current waveform.

20 Claims, 4 Drawing Sheets

Related U.S. Application Data continuation of application No. 16/394,347, filed on Apr. 25, 2019, now Pat. No. 11,189,449.

(51) Int. Cl.
 *H01H 9/56* (2006.01)
 *H01H 33/59* (2006.01)
 *H01H 47/00* (2006.01)
 *H01H 47/26* (2006.01)
 *H02H 3/02* (2006.01)

(52) U.S. Cl.
 CPC .......... *H01H 47/002* (2013.01); *H01H 47/26* (2013.01); *B64D 2221/00* (2013.01); *H01H 33/593* (2013.01); *H02H 3/021* (2013.01)

(58) Field of Classification Search
 CPC ........ H02H 3/021; H02M 1/36; H02M 1/047; H02M 1/083; H02M 5/2935; B64D 41/00; B64D 2221/00; G01R 19/175
 See application file for complete search history.

(56) References Cited

U.S. PATENT DOCUMENTS

| | | | |
|---|---|---|---|
| 7,010,436 B2 | 3/2006 | Larsson et al. | |
| 7,227,732 B2 | 6/2007 | Wang | |
| 7,804,674 B2 | 9/2010 | Keller et al. | |
| 8,514,542 B2 | 8/2013 | Kuo | |
| 8,559,154 B2 | 10/2013 | Li et al. | |
| 9,042,063 B2 | 5/2015 | Normoyle et al. | |
| 9,646,795 B2 | 5/2017 | Komatsu et al. | |
| 9,754,744 B2 | 9/2017 | Wan et al. | |
| 10,141,143 B2 | 11/2018 | Bock et al. | |
| 2010/0200383 A1 | 8/2010 | Saito | |
| 2011/0102052 A1* | 5/2011 | Billingsley | H01H 9/542 |
| | | | 327/365 |
| 2011/0318039 A1* | 12/2011 | Watanabe | H02M 1/4208 |
| | | | 399/88 |
| 2012/0206851 A1* | 8/2012 | Weber | H01H 9/56 |
| | | | 361/195 |
| 2013/0342950 A1* | 12/2013 | Westrick, Jr. | H01H 47/22 |
| | | | 361/170 |
| 2015/0028877 A1 | 1/2015 | McCormick et al. | |
| 2015/0098164 A1* | 4/2015 | Lenig | H01H 47/18 |
| | | | 361/185 |
| 2015/0108904 A1 | 4/2015 | Chen | |
| 2015/0364273 A1 | 12/2015 | Lim | |
| 2016/0131712 A1 | 5/2016 | Bock et al. | |
| 2017/0144554 A1* | 5/2017 | Mifsud | H01H 47/02 |
| 2017/0229269 A1* | 8/2017 | Smith | H01H 47/20 |
| 2018/0130618 A1* | 5/2018 | Ramirez | H01H 9/56 |
| 2018/0158633 A1* | 6/2018 | Brandt | G01R 31/3278 |
| 2019/0013662 A1* | 1/2019 | Norrga | H01H 33/59 |

FOREIGN PATENT DOCUMENTS

| | | |
|---|---|---|
| CN | 105302051 A | 2/2016 |
| CN | 106298365 A | 1/2017 |
| DE | 19507933 C1 | 5/1996 |
| DE | 102005018012 A1 | 10/2006 |
| DE | 19882678 B4 | 9/2010 |
| EP | 2071701 A1 | 6/2009 |
| EP | 2789068 B1 | 3/2016 |
| EP | 2237296 B1 | 6/2017 |
| EP | 3018676 B1 | 10/2018 |
| WO | 9528025 A1 | 10/1995 |
| WO | 9636982 A1 | 11/1996 |

\* cited by examiner

ZERO CROSSING CONTACTOR AND METHOD OF OPERATING

CROSS REFERENCE TO RELATED APPLICATION(S)

This application is a continuation of U.S. patent application Ser. No. 17/509,770, filed Oct. 25, 2021, now U.S. Pat. No. 11,664,180, issued May 30, 2023, which is a continuation of U.S. patent application Ser. No. 16/394,347, filed Apr. 25, 2019, now U.S. Pat. No. 11,189,449, issued Nov. 30, 2021, which claims priority to and the benefit of British Patent Application No. 1806782.7 filed Apr. 25, 2018, all of which are incorporated in their entirety by reference.

BACKGROUND

In electrical power systems, there is often a need to electrically switch on and switch off the power system or portions thereof. In alternating current (AC) systems, the current periodically reverses direction, varying between a positive and negative voltage in a sinusoidal cycle. At the change between directions, the voltage is zero. Traditional AC contactors will switch at any point during the AC cycle, without regard to the current or voltage. Switching a contactor in this manner can lead to voltage or current spikes, voltage surges, contact wear at the contactor and other stresses, noise, arcing, and deposition from arcing.

BRIEF DESCRIPTION

In one aspect, the disclosure relates to a method of operating a contactor, the method comprising receiving, in a controller module, at least two operational characteristics of the contactor, with each operational characteristic representative of a delay time, determining, in the controller module, a contactor time delay for at least one of disconnecting or connecting a power supply by the contactor, the contactor time delay being a summation of a set of delay timings based on the delay time of each operational characteristic, and initiating, by the controller module, the at least one of disconnecting or connecting of the power supply by the contactor at an initiation time prior to a zero-crossing voltage of an alternating current (AC) waveform of the power supply, wherein the initiation time anticipates the zero-crossing voltage based upon the contactor time delay.

In another aspect, the disclosure relates to a method of operating a contactor, the method comprising receiving, in a controller module, at least two operational characteristics of the contactor, with each operational characteristic representative of a delay time, determining, in the controller module, a total contactor time delay defined by a timing estimation to operably disconnect or connect a power supply and an electrical load, based on the delay time of each operational characteristic, determining a contactor initiation time based on at least one delay time and an alternating current (AC) waveform of the power supply, such that an expiration of the total contactor time delay coincides with a zero-crossing voltage of the AC waveform, and initiating, by the controller module, a toggling of the power supply by the contactor at the contactor initiation time.

In another aspect, the disclosure relates to a method of operating a contactor, the method comprising receiving, in a contactor assembly comprising a contactor switch selectably connecting an input with an output, a contactor coil operably coupled to the contactor switch and configured to actuate the contactor switch, at least two sensors configured to measure an operational characteristic of the contactor assembly, and a controller module configured to receive at least two electrical signals from the at least two sensors, with each electrical signal representative of a delay time, determine a contactor time delay as a summation of a set of delay timings based upon the at least two electrical signals, and initiate at least one of a disconnecting or connecting of the input and the output by the contactor switch at an initiation time prior to a zero-crossing voltage of an alternating current (AC) waveform of a power supply wherein the initiation time is based upon the contactor time delay.

DETAILED DESCRIPTION

The disclosure is related to a zero-crossing contactor assembly and method of operating, which can be used, for example, in a power distribution system for an aircraft. While this description is primarily directed toward a power distribution system for an aircraft, it is also applicable to any environment utilizing an alternating current electrical system, such as any power distribution system in non-aircraft implementations.

As used herein, the term "upstream" refers to moving in a direction toward an inlet or beginning position, or a component being relatively closer to the inlet or beginning position as compared to another component. The term "downstream" refers to a direction toward an outlet or end position or being relatively closer to the outlet or end position as compared to another component. Furthermore, the terms "upstream" or "downstream" can be used as a reference relative to a current direction for an alternating current circuit, which can reverse direction periodically, defining the meaning of the terms "upstream" or "downstream" based upon the current direction for the circuit. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Additionally, while terms such as "voltage", "current", and "power" can be used herein, it will be evident to one skilled in the art that these terms can be interchangeable when describing aspects of the electrical circuit, or circuit operations.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional or separate components. Such a provision can be provided as a signal, such as an electrical signal, to said additional or separate components. For instance, the measured value can be provided to a controller module or processor, and the controller module or processor can perform processing on the value to determine a representative value or an electrical characteristic representative of said value.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The disclosure can be implemented in any electrical circuit environment having a switch, electrical switch, or switching element. A non-limiting example of an electrical circuit environment that can include aspects of the disclosure can include an aircraft power system architecture, which enables production of electrical power from at least one spool of a turbine engine, preferably a gas turbine engine, and delivers the electrical power to a set of electrical loads. In one non-limiting example, the electrical switch or switching element can include at least one solid state switch, such as a solid state power controller (SSPC) switching device. One non-limiting example of the SSPC can include a silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can be included.

Figure 1:
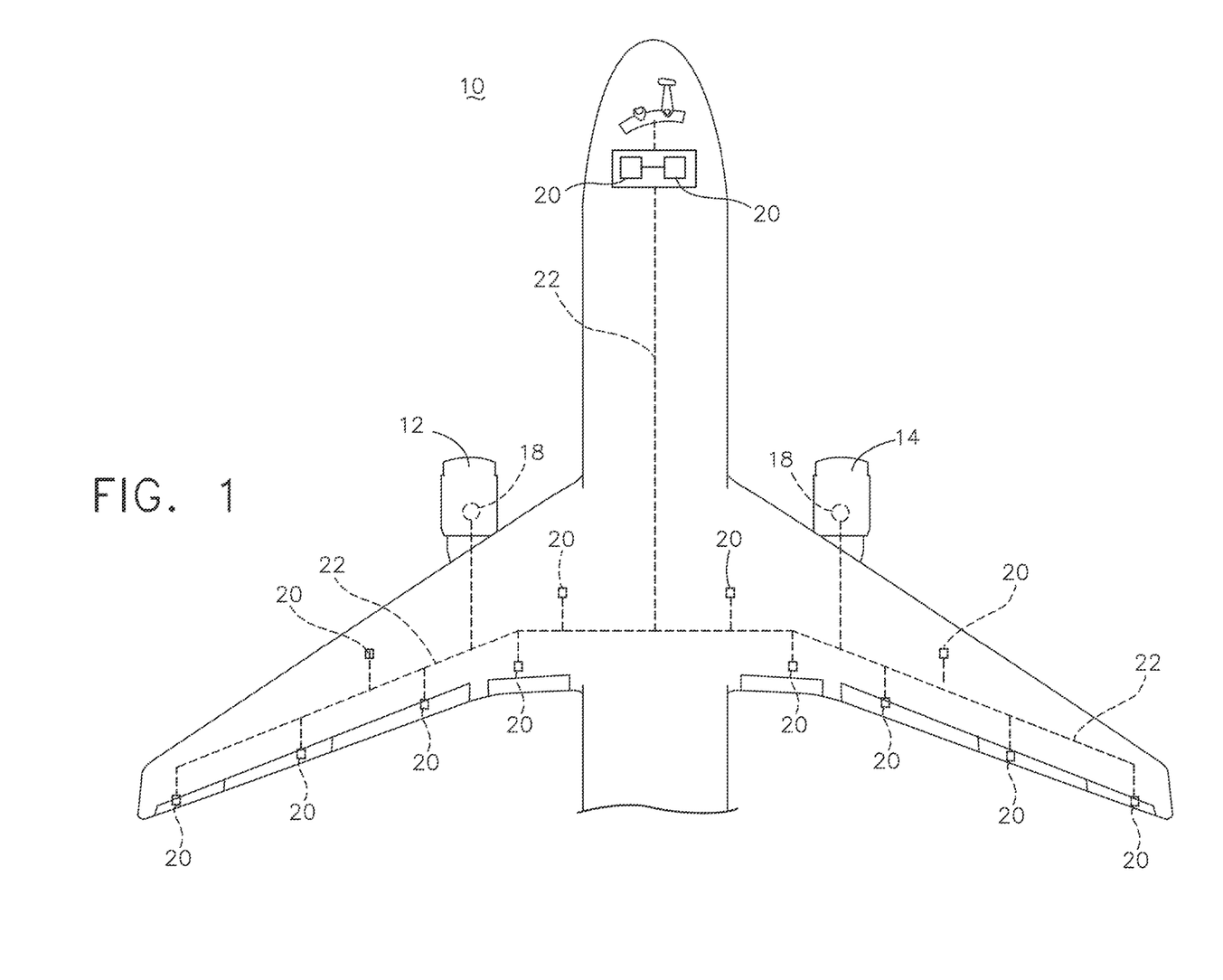
FIG. 1 is a top down schematic view of an aircraft and power distribution system in accordance with aspects described herein.

As illustrated in FIG. 1, an aircraft 10 is shown having at least one gas turbine engine, shown as a left engine system 12 and a right engine system 14. Alternatively, the aircraft 10 can have fewer or additional engine systems. The left and right engine systems 12, 14 can be substantially identical, and can further include at least one electric machine, such as a generator 18. The aircraft 10 is shown further including a plurality of power-consuming components, or electrical loads 20, for instance, an actuator load, flight critical loads, and non-flight critical loads. The electrical loads 20 are electrically coupled with at least one of the generators 18 via a power distribution system 22.

In the aircraft 10, the operating left and right engine systems 12, 14 generates mechanical energy which can be extracted via a spool, to provide a driving force for the generator 18. The generator 18, in turn, delivers the power to the electrical loads 20 via the power distribution system 22 for load operations. Additional power sources for providing power to the electrical loads 20, such as emergency power sources, ram air turbine systems, or starter/generators, are envisioned. It will be understood that while the power distribution system 22 is shown in an aircraft environment, the power distribution system is not so limited and has general application to electrical power systems in non-aircraft applications, such as other mobile applications and non-mobile industrial, commercial, and residential applications.

Figure 2:
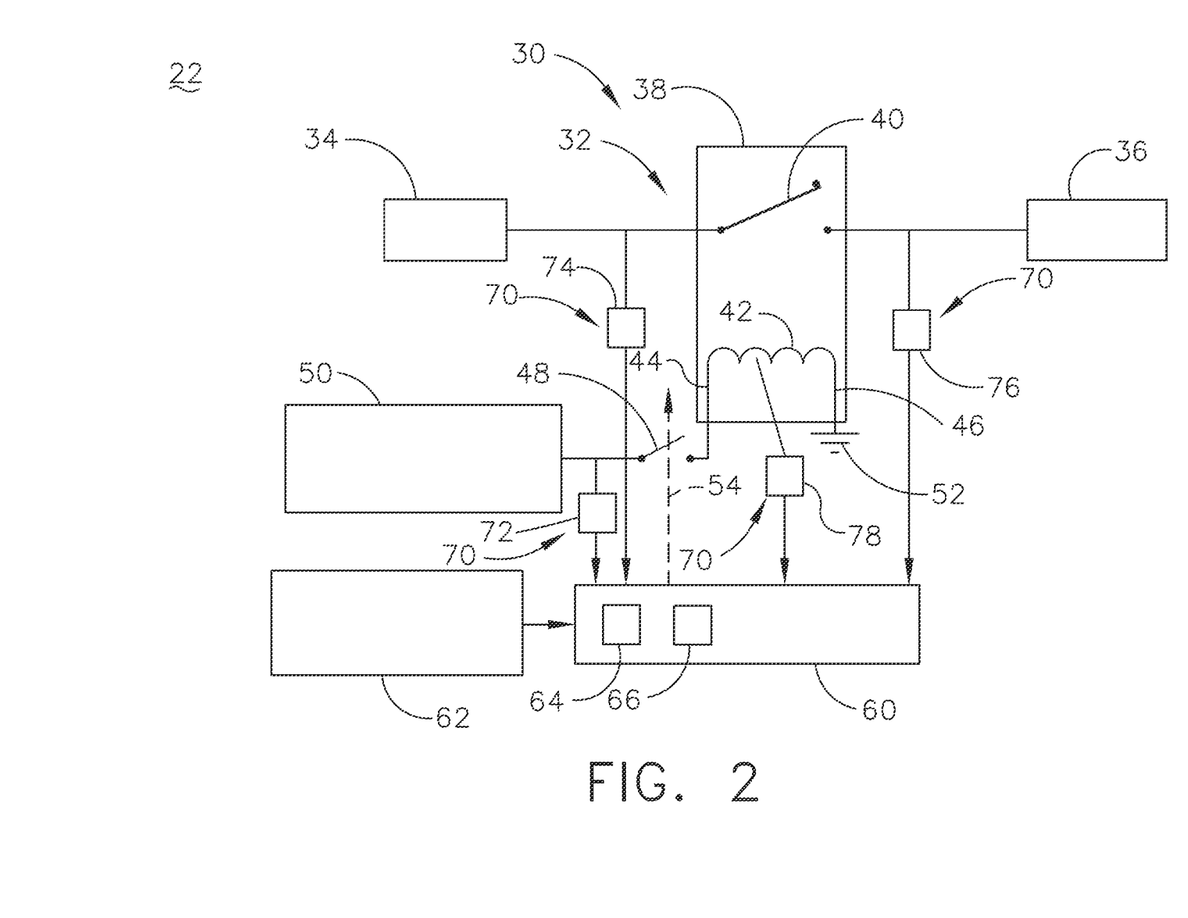
FIG. 2 is a schematic view of an electrical circuit forming a portion of the power distribution system of FIG. 1 including a contactor assembly, in accordance with aspects described herein.

Referring now to FIG. 2, an electrical circuit 30 can form at least a portion of the power distribution system 22 having the contactor assembly 32. It should be understood that the electric circuit 30 is merely one example aspect of an electrical network or power distribution system 22, or subcomponents thereof, for ease of understanding. Further non-limiting examples of the disclosure can be included or contained as a portion of a printed circuit board, field programmable gate array (FPGA), or the like.

The contactor assembly 32 can form a portion of the circuit 30, positioned between a power supply input 34, such as the generator 18 (not shown), and a power supply output 36 connected with a power consuming device, such as the electrical load 20 (not shown). In non-limiting examples, the power supply input 34 can include a voltage input and the power supply output 36 can include a voltage output. The contactor assembly 32 can further include a contactor 38 schematically shown to include a switch 40 and a contactor coil 42. The switch 40 can be configured to move between a first opened condition or state and a second closed condition or state. In the opened condition, the contactor 38 or switch 40 prevents, disconnects, or otherwise disables current conduction between the power supply input 34 and the power supply output 36, while in the closed condition, the contactor 38 or switch 40 permits, allows, connects, or otherwise enables current conduction between the power supply input 34 and the power supply output 36. The switch 40 can be operable between the first opened condition or the second closed condition by selective energization of the contactor coil 42. For example, the application of a voltage or power to the coil can effectively or operably close the switch, while the lack of a voltage or power to the coil can effectively or operably open the switch. One non-limiting example for the contactor assembly 32 can include a solenoid, while any suitable element or component configured to actuate or be energized to actuate the switch 40 within the contactor 38 is contemplated.

The circuit 30 can further include a coil switch 48 connected to the contactor coil 42 at a first end 44 of the contactor coil 42. The coil switch 48 can be operable between a first opened condition or state and a second closed condition or state, In the first opened condition, a voltage or power is prevented, disconnected, or otherwise disabled across the coil switch 48, while in the second closed states, a power or voltage is permitted, allowed, connected, or otherwise enabled across the coil switch 48. In one non-limiting example, a contactor coil energizing supply 50 can include a power supply or a power source that electrically and selectively couples to the coil switch 48, selectively providing a voltage or power to the coil switch 48. The circuit 30 can further include a ground 52 provided at a second end 46 of the contactor coil 42, opposite of the coil switch 48, electrically grounding the contactor coil 42.

The contactor assembly 32 can further include a controller module 60 electrically couple within the circuit 30. The controller module 60 can include at least one processor 64 and memory 66, and can be configured to run any suitable program or executable instructions designed to carry out operation of the circuit 30, the contactor assembly 32, or portions thereof. The controller module 60 can be controllably connected with the coil switch 48, such that the controller module 60 can generate, send, or otherwise provide a control signal 54 (shown as a dotted arrow) to selectively control the switching between the first and second states of the coil switch 48.

A command controller 62 can be further communicably coupled with the controller module 60, and can be configured to provide a command, such as an instruction to open or close a switch, or operate a portion of the circuit 30. The command controller 62 can also include at least one processor and memory (not shown), and can be configured to run any suitable program or executable instruction. While shown adjacent the controller module 60, the command controller 62 can be located remotely from the controller module 60, and adapted to send a signal or instruction to the controller module 60 relating to the contactor assembly 32 or the circuit 30.

A set of sensors 70 can be included with the contactor assembly 32, and can include a contactor coil operational characteristic sensor 72, a waveform sensor 74, and a temperature sensor 78. The set of sensors 70 can be communicatively and operatively couple with the controller module 60, such that the set of electrical signals can be generated, provided, supplied to, or otherwise received by the controller module 60. The contactor coil operational characteristic sensor 72 can be configured to generate a signal representative of a voltage, current, or otherwise, which can be representative of an operational characteristic of the contactor coil energizing supply 50. Non-limiting examples of operational characteristics can include an "on" characteristic or an "off" characteristic, for example, as well as an "active," "inactive," "closed," or "opened" in additional non-limiting examples. Additionally, the set of sensors 70 is further shown including an optional output voltage sensor 76. While shown as four sensors, it is contemplated that the set of sensors 70 can include additional or fewer sensors. The contactor coil operational characteristic sensor 72 can couple to the circuit 30 between the contactor coil energizing supply 50 and the coil switch 48. In one non-limiting example, the waveform sensor 74 can couple to the circuit 30 between the power supply input 34 and the switch 40 and can be configured or adapted to sense or measure a waveform frequency for the AC current passing across the switch 40 from the power supply input 34 to the power supply output 36. The waveform sensor 74 can be configured to generate a signal representative of an alternating current (AC) waveform supplied by the power supply input 34. Such a waveform can be substantially sinusoidal, represented as a reversing current direction over a period of time. In another non-limiting example, the output voltage sensor 76 can couple the circuit 30 between the switch 40 and the power supply output 36, and can be configured or adapted to sense or measure a voltage downstream of the switch 40, between the contactor assembly 32 and the power supply output 36. The output voltage sensor 76 can be configured to generate a signal representative of a voltage, such as a voltage transmitted by way of the contactor assembly 32 when the switch 40 is in the second closed position. The temperature sensor 78 can be positioned to measure a temperature of the contactor coil 42, and configured to generate a signal representative of a temperature of the contactor coil 42.

During operation, the contactor assembly 32 or contactor 38 operates to selectively enable or disable conduction of power supplied to the power supply input 34 to the power supply output 36. The selective enabling or disabling can be operably or effectively controlled by way of the controller module 60. In one non-limiting example, the command controller 62, or another controlling component, can supply or provide a demand, desire, or instruction to the controller module 60 to connect or disconnect the power supply input 34 from the power supply output 36 by way of the contactor coil 42, the coil switch 48, the control signal 54, and the contactor coil energizing supply 50, or a combination thereof. Such an instruction can be based on a schedule or can be on demand. Based upon said instruction, the controller module 60 operably or effectively supplies the control signal 54 to the coil switch 48, instructing or controlling the coil switch 48 to toggle to the closed state, energizing the contactor coil 42 with the contactor coil energizing supply 50. Therefore, operation of the switch 40 of the contactor 38 is controlled by way of selectively powering the contactor coil 42 in response to the control signal 54 from the controller module 60. Thus, the controller module 60 can effectively operate the contactor assembly 32.

Operation of the contactor assembly 32 can further be based on a number of operation characteristics. For example, the operational characteristics can include at least one of a frequency of the electric current supplied to the power supply input 34, a coil temperature, a coil operational characteristic, an error correction, or a combination thereof. The frequency of the electrical circuit can be representative of a sinusoidal electrical frequency for the alternating electrical current passing from the power supply input 34. In one non-limiting example, the determination of the frequency of the electrical circuit from the power supply input 34 can include sensing the frequency, or a characteristic of the frequency such as a zero-crossing voltage, with the waveform sensor 74, and generating and providing a signal representative of the waveform or waveform characteristic to the controller module 60.

The contactor coil temperature can be representative of a temperature of the contactor coil 42 both when the contactor coil 42 is energized and is not energized. In one non-limiting example, the determination of the coil temperature can be determined by sensing the temperature of the contactor coil 42 with the temperature sensor 78, and generating and providing a signal representative of the temperature of the contactor coil 42 to the controller module 60.

The coil operational characteristic can include an "on" or an "off" characteristic, such as the time it takes to open or close the coil switch 48. Such a coil operational characteristic can be determined by sensing an electrical characteristic of the coil switch 48 or the contactor coil energizing supply 50 by way of the contactor coil operational characteristic sensor 72. A signal representative of the coil operational characteristic can be generated and provided by the contactor coil operational characteristic sensor 72 to the controller module 60.

An error correction can include a measurement indicative of or representative of an error measurement of the circuit 30, that is, a difference in expected operation of the circuit 30, the contactor 38, or the contactor assembly 32, compared with the actual operation of the circuit 30, the contactor 38, or the contactor assembly 32.

The controller module 60 can store at least a subset of the signals received from the set of sensors 70 in the memory 66. The controller module 60, receiving or storing the electrical signals from the set of sensors 70, can utilize the processor 64 to incorporate the electrical signals as values to initiate disconnecting or connecting of the power supply from the power supply input 34 and the power supply output 36. While aspects of the disclosure are described with respect to "disconnecting" the power supply from the power supply input 34 from the power supply output 36, it will be understood that the disclosure is also applicable to any connecting, or any toggle or toggling of the contactor between a disconnecting and connecting operation. More specifically, the controller module 60 can determine a disconnection, connection, or contactor time delay based upon the values of the electrical signals from the set of sensors 70. For example, the temperature value of the contactor coil 42 provided by the temperature sensor 78 can be representative of a first time delay such as a coil temperature delay time. As used herein the contactor coil 42 temperature delay time is representative of a delay in timing in the contactor coil 42 operably effecting the switch 40 to toggle between opened and closed states, due to the temperature of the contactor coil 42. For example, the temperature of the contactor coil 42 affects the operation of the coil, wherein a higher temperature generally causes an increased delay in toggling the switch 40, whereas a lower temperature of the contactor coil 42 generally causes a reduced delay in toggling the switch 40.

A contactor coil operational characteristic provided by the contactor coil operational characteristic sensor 72 can be representative of a second time delay such as a coil operational characteristic delay time, which is representative of the expected delay in sufficiently energizing the contactor coil 42 by way of the contactor coil energizing supply 50 and the coil switch 48. The contactor coil operational characteristic can include, or be at least partially based on, the supply voltage of the contactor coil energizing supply 50, the time delay in operating the coil switch 48 after receiving a control signal 54, or a combination thereof. The time for providing a signal across the circuit 30 can be representative of a third time delay such as an electrical signal delay time, based on the specific configuration of the circuit signal traces. An error correction value can be representative of a fourth time delay based on a difference in expected operation of the circuit 30, the contactor 38, or the contactor assembly 32, compared with the actual operation of the circuit 30, the contactor 38, or the contactor assembly 32. In one non-limiting example, the error correction characteristic can include sensing or measuring the voltage at the power supply output 36, by the output voltage sensor 76. In this example, the output voltage sensor 76 can generate and provide a signal representative of the voltage, such as when the voltage increases, decreases, or the like, to the controller module 60. In response, the controller module 60 can compare an actual timing of the signal representative of the voltage from the output voltage sensor 76, and compare the timing with the expected, estimated, calculated timing of the circuit 30 operations. For instance, if the controller module 60 initiates a "disconnect" or "connect" command to operably toggle the switch 40 of the contactor 38 to disable or enable supplying power to the power supply output 36, the controller module 60 can receive a signal indicating when the voltage at the power supply output 36 falls (e.g. when the power is disconnected or connected), by way of the output voltage sensor 76. A difference in compared or expected timing can result in a determined error correction characteristic. In one non-limiting example, it will be understood that a calculated, compared, or determined error correction characteristic can be represented as an "error delay time," and accounted for in the following or a subsequent connection or disconnection cycle.

Figure 3:
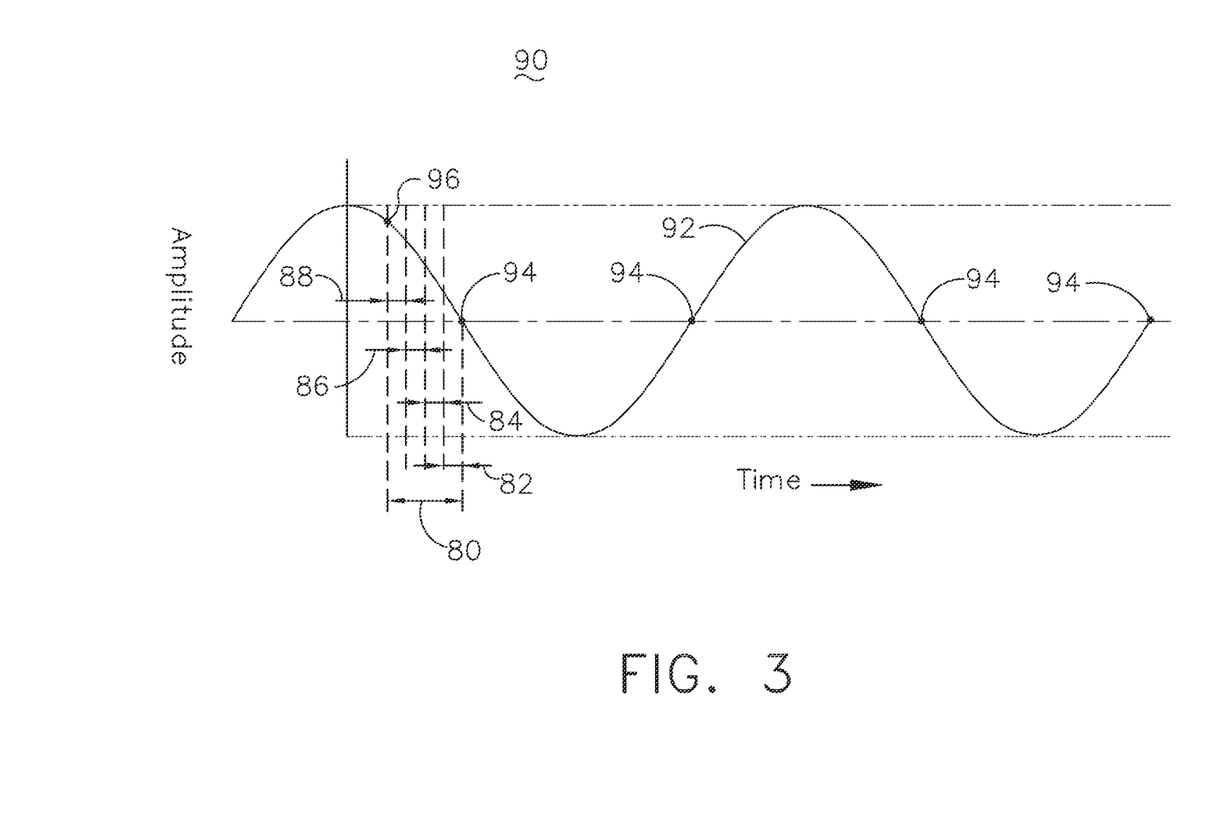
FIG. 3 is a graph plotting an alternating current waveform for the electrical circuit of FIG. 2, including a total delay prior to a zero-crossing point, in accordance with aspects described herein.

Referring to FIG. 3, a graph 90 includes a plot showing a sinusoidal alternating current (AC) waveform 92 representing an amplitude for an alternating current passing along the circuit 30 over a period of time. In one non-limiting example, the AC waveform 92 can be representative of a signal provided to the controller module 60 from the waveform sensor 74. The AC waveform 92 includes a set of zero-crossing points 94, representative of a zero voltage or current as the alternating current reverses direction. Such zero-crossing points 94 can be determined by the controller module 60 based upon a consistent frequency for the current, such that the controller module 60 can accurately predict a schedule for future zero-crossing points 94. It is beneficial to operate the contactor assembly 32 such that the effective connecting, disconnecting, enabling, or disabling of the contactor assembly 32 coincides with the zero-crossing point. However, as described above with respect to the delays, the initial decision or initiation of operation of the contactor assembly 32 does not effectively or instantaneously result in the opening or closing of the switch 40, as set of operational delays can be intervening. Thus, non-limiting aspects of the disclosure can be included wherein the controller module 60 can determine a total contactor time delay, that is, an estimated, predicted, or otherwise determined summated time delay between initiating a disconnection or connection command, instruction, or control signal, and the actual or effective disconnection or connection of the power conducted via the contactor 38, and initiate the disconnection or connection such that the effective disconnection or connection coincides with the zero-crossing points 94. While the specific example of initiating a "disconnect" is described, non-limiting aspects of the disclosure are also applicable and included wherein the controller module 60 can determine a total contactor time delay and initiate the connecting or supplying of the power conducted via the contactor 38, and such that the effective connecting coincides with the zero-crossing points 94.

A total delay time 80 can include the summation of a set of delay timings, including but not limited to, the coil temperature delay time 82, the coil operational characteristic delay time 84, the electrical signal delay time 86, and the error delay time 88, as described above. As illustrated, the controller module 60 can determine a total time delay 80 of the aforementioned delays, or determine individual delays for each respective delay, which can be summated in a subsequent step. Additionally, it is contemplated that the aforementioned delay times 82, 84, 86, 88 and any other delay between initiating a disconnecting or connecting of the power supply by the contactor 38 in anticipation of a zero-crossing voltage of the AC waveform 92, and the effective disconnecting or connecting of the power supply, can be utilized in determining a total delay time 80. While shown as four delays as 82, 84, 86, 88, any number of intervening, determined, calculated, or comparison delays is contemplated, as any system component or operational function contributing to total delay time 80, which results in a delay of time between initiating an instruction to open the switch 40 and effectively disconnecting or connecting the power supply input 34 and the power supply output 36. Additionally, while the set of time delays are illustrated as approximately the same length of time (e.g. the same time delay) the example delays are for purposes of illustration only and the time delays for the collective set of time delays, or the relative delay timings can vary.

The processor 64 in the controller module 60 can calculate the total time delay 80 based upon the signals received from the contactor coil operational characteristic sensor 72, the output voltage sensor 76, and the temperature sensor 78, or optionally including any other time delay or sensor input, and determine a schedule, estimation, prediction, or the like, for a subsequent or upcoming zero-crossings for the AC waveform 92 from the signal provided by the waveform sensor 74. The controller module 60 can then calculate an initiation time 96. The initiation time 96 can be a time calculated as an anticipated zero-crossing point 94 minus the total delay time 80. Still referring to FIG. 3, the initiation time 96 is determined prior to a zero-crossing point 94 by the total delay time 80 as the sum of the time delays 82, 84, 86, 88.

The controller module 60 can initiate operation of the switch 40 at the initiation time 96 to coincide with the zero-crossing point 94 of the AC waveform 92 to effectively disconnect or connect the switch 40 at the zero-crossing point 94. In this manner, the contactor assembly 32 can utilize the set of sensors 70 and the controller module 60 to effectively calculate an operational delay for the contactor assembly 32, and can operate the switch 40 to coincide with the zero-crossing point 94 for the AC waveform.

Similarly, the controller module 60 can utilize the output voltage sensor 76 to continuously determine the error delay time 88 based upon a voltage between the switch 40 and the power supply output 36. 'Continuously' as used herein can mean at an operation of the contactor assembly 32. Alternatively, the output voltage sensor 76 can make an on-demand measurement, such as when a predicted, calculated, determined, or estimated total delay time 80 is found to be outside an expected range or threshold of operation, such as a predetermined tolerance. If such a measured voltage is not zero, the delay for the error delay time 88 can be updated after operation of the contactor assembly 32, and input into the controller module 60 to update the total delay time 80 for future operations of the contactor assembly 32. Therefore, as the contactor assembly 32 changes over time, such as degradation due to age or other environmental factors, the output voltage sensor 76 can provide for updating the error delay time 88. As such, an accurate zero-crossing switch can be consistently achieved, particularly over time.

Figure 4:
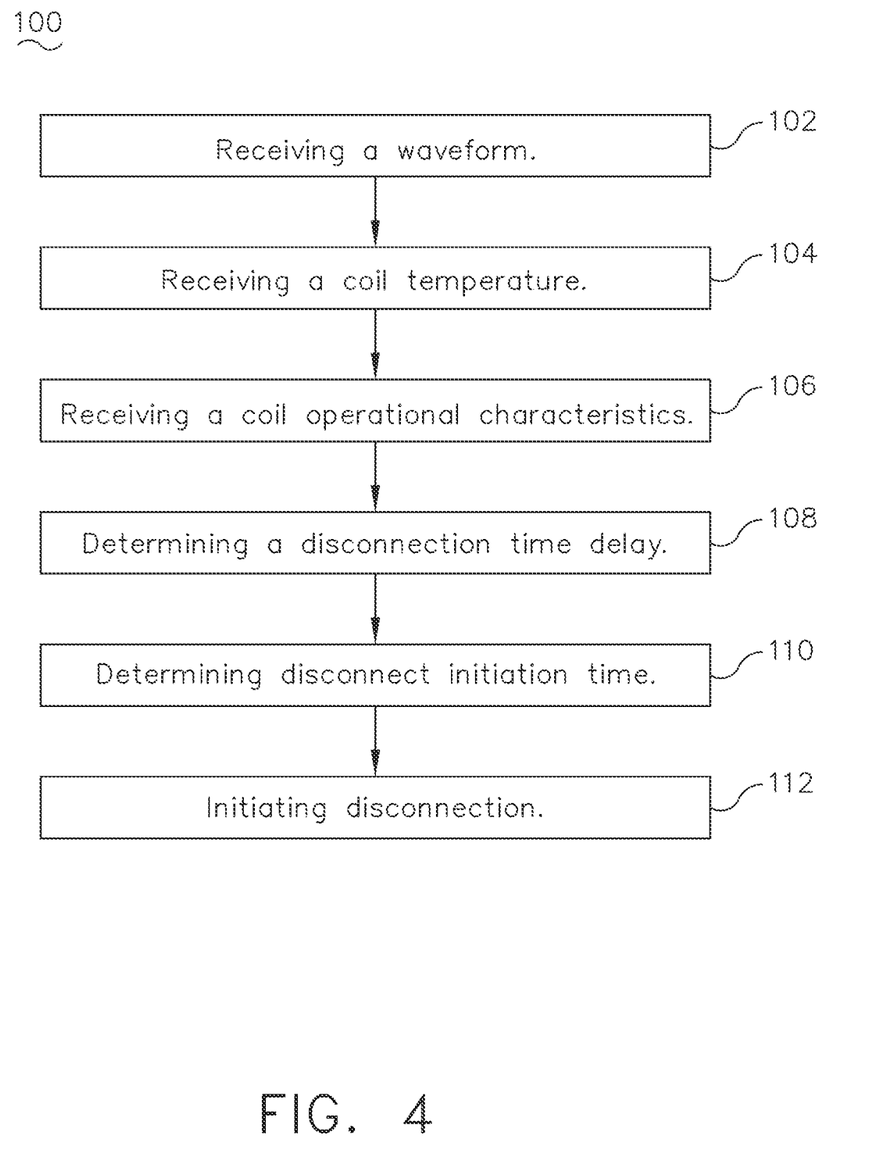
FIG. 4 is a block diagram illustrating a method of operating the contactor assembly of FIG. 2, in accordance with aspects described herein.

Referring now to FIG. 4, a flow chart demonstrates a method 100 of operating a contactor 32 can include receiving, in a controller module 60, an electrical signal representative of an alternating current (AC) waveform 92 of a power supply or power supply input 34, at 102. The method 100 can further include receiving, in the controller module 60, a temperature value representative of a temperature of a contactor coil 42, at 104. Alternatively, the method 100 could include receiving, in the controller module 60, the temperature of the contactor coil 42 energizable to disconnect or connect the power supply from an electrical load, at 104. The method 100 can further include receiving, in the controller module 60, a contactor coil operational characteristic, or a contactor coil energizing supply characteristic, at 106.

The method 100 can also include determining, in the controller module 60, a total time delay or a contactor time delay 80 for disconnecting or connecting the power supply 34, by the contactor 32, with the contactor time delay 80 being the summation of a set of delay timings 82, 84, 86 based on the electrical signal, the temperature value, and the contactor coil operational characteristic, at 108. Alternatively, the method 100 can include determining, in the control module 60, a total contactor time delay 80 defined by a timing estimation to operably disconnect or connect the power supply 34 and the electrical load or power supply output 36, based on the coil temperature delay time 82 and the coil operational characteristic delay time 84, at 108.

Optionally, the method 100 can include determining an initiation time or a contactor initiation time 96 based on the total contactor time delay 80 and the AC waveform 92 of the power supply, such that the expiration of the total contactor time delay 80 coincides with a zero-crossing point 94 of the AC waveform 92, at 110.

The method 100 can further include initiating, by the controller module 60, the disconnecting or connecting of the power supply 34 by the contactor 32 at an initiation time 96 prior to a zero-crossing point 94 in the AC waveform 92, wherein the initiation time 96 anticipates the zero-crossing point 94 based upon the contactor time delay 80, at 112. Alternatively, the method 100 can include initiating, by the controller module 60, the disconnecting or connecting of the power supply 34 by the contactor 32 at the contactor initiation time 96, at 112.

In a non-limiting example, the effective disconnecting or connecting of the power supply can coincide with the zero crossing point 94 of the AC waveform 92. In another non-limiting example, the determining is further based on estimating the contactor time delay 80. In yet another example, the determining is further based on predicting the contactor time delay 80. In another example, the determining the contactor time delay 80 is further based on the summation of the set of delay timings 82, 84, 86 and an error delay time or error correction value 88 defined by a difference between an effective disconnecting or connecting of the power supply 34 and the zero-crossing point 94 of the AC waveform 92 of at least one previous contactor 32 disconnection or connection. In yet another non-limiting example, the error correction value 88 is based upon a difference in a voltage measured at an effective disconnecting or connecting of the power supply 34 and a zero value for the voltage. In another non-limiting example, the error correction value is further based upon the measured voltage at the effective disconnecting or connecting, and the AC waveform 92 of the power supply 34. In yet another non-limiting example, the initiating further includes energizing a solenoid contactor coil 42 with a contactor coil energizing supply 50 to operably disconnect or connect the power supply 34. In yet another non-limiting example, initiating further includes closing a coil switch 48 to provide the contactor coil energizing supply 50 to the solenoid contactor coil 42. In another example, initiating can further include energizing the contactor coil 42 with the contactor coil energizing supply 50 at the contactor initiation time 96.

The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described method.

Therefore, it should be appreciated that the contactor assembly 32 as described herein can provide for accurate zero-crossing voltage for a switch 40. Such accuracy can provide for decreasing contact wear at the switch 40 itself, leading to increased component lifetime and reduced maintenance. Furthermore, reduction of contact deposition at zero current and voltage can be achieved. Electromagnetic noise along the power supply is reduced and can eliminate spikes to a much higher level. Stress on upstream and downstream electrical loads can be reduce, as well as reducing the occurrence of spikes and surges on said electrical loads. Overall a cleaner power consumption is achieved, which can lead to an overall reduction in power consumption.

The aspects disclosed herein provide a method and apparatus for operating a contactor assembly. The technical effect is that the above described aspects enable the disconnecting or connecting of the contactor after determining a total contactor time and initiating the disconnection or connecting of the power supply by the contactor at the total contactor time or delay such that the effective disconnection or connection occurs or coincides with a zero-crossing voltage of the input power AC waveform, as described herein. The circuit and contactor assembly as described herein can be suitable for different or all types of power supplies, powered electronics or circuit boards, or any suitable electrical power distribution system. It should be appreciated that the contactor assembly provides for effectively disconnecting or connecting an AC circuit at a zero-crossing point where the current for the AC circuit is at or near zero. Utilizing one or more sensors, measurements of the contactor assembly can be provided to a controller module. The controller module can determine a set of actual, predicted, or estimated time delay values defining a time between the contactor assembly operably connecting or disconnecting an input with an output, after receiving a command or instruction to do so. Utilizing the determined time delay, as described herein, the contactor assembly can initiate disconnection or connection of the power supply prior to, ahead of, or in anticipation of a zero-crossing point on the AC waveform for the AC circuit, such that the power supply is effectively disconnected or connected at or near the zero-crossing point. Therefore, effectively disconnecting or connecting the power supply at the zero-crossing point can be accurately and consistently achieved. Disconnecting or connecting at the zero-crossing point can reduce contact wear and contact deposition, which can increase lifetime of the contactor assembly and reduce maintenance. Furthermore, stress on upstream and downstream electrical loadings can be reduced, as well as reducing the occurrence of voltage spikes and surges. Overall power consumption can be cleaner, reducing total power consumption. Noise generated by the contactor assembly is also reduced, and can reduce spikes surges resultant of the reduced noise.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a contactor, the method comprising:
   receiving, in a controller module, at least two operational characteristics of the contactor, with each operational characteristic representative of a delay time, the at least two operational characteristics of the contactor including at least two of:
      a contactor coil temperature sensor configured to measure a temperature of the contactor coil;
      a contactor coil energizing supply characteristic; or
      an error correction value signal defined by a difference between an effective toggling of a power supply by the contactor along an AC waveform and a zero-crossing voltage of the AC waveform of at least one previous contactor disconnection or connection;
   determining, in the controller module, a contactor time delay for at least one of disconnecting or connecting the power supply by the contactor, the contactor time delay being a summation of a set of delay timings based on the delay time of each operational characteristic; and
   initiating, by the controller module, the at least one of disconnecting or connecting of the power supply by the contactor at an initiation time prior to the zero-crossing voltage of an alternating current (AC) waveform of the power supply, wherein the initiation time anticipates the zero-crossing voltage based upon the contactor time delay.

2. The method of claim 1, wherein the at least two operational characteristics of the contactor further include at least two of an electrical signal representative of the AC waveform and of an electrical signal delay time, a temperature value representative of the temperature of a contactor coil and of a coil temperature delay time, or a contactor coil operational characteristic representative of a contactor coil operational characteristic delay time.

3. The method of claim 1, wherein an effective disconnecting or connecting of the power supply coincides with the zero-crossing voltage of the AC waveform.

4. The method of claim 1 wherein the determining is further based on estimating the contactor time delay.

5. The method of claim 1 wherein the determining is further based on predicting the contactor time delay.

6. The method of claim 1 wherein the determining the contactor time delay is further based on the summation of the set of delay timings and an error correction value defined by a difference between an effective disconnecting or connecting of the power supply along the AC waveform and the zero-crossing voltage of an AC waveform of at least one previous contactor disconnection or connection.

7. The method of claim 6 wherein the error correction value is based upon a difference in a voltage measured at an effective disconnecting or connecting of the power supply and a zero value for the voltage.

8. The method of claim 7 wherein the error correction value is further based upon the voltage at the effective disconnecting or connecting, and the AC waveform of the power supply.

9. The method of claim 1 wherein the initiating further includes energizing a solenoid coil with a coil power supply to operably disconnect or connect the power supply.

10. The method of claim 9 wherein the initiating further includes closing a coil switch to provide the coil power supply to the solenoid coil.

11. A method of operating a contactor, the method comprising:
receiving, in a controller module, at least two operational characteristics of the contactor, with each operational characteristic representative of a delay time;
determining, in the controller module, a total contactor time delay defined by a timing estimation to operably disconnect or connect a power supply and an electrical load, based on the delay time of each operational characteristic, a temperature of a contactor coil, a contactor coil energizing supply characteristic, and an error correction value defined by a difference between an effective toggling of the power supply by the contactor along an AC waveform and a zero-crossing voltage of the AC waveform of at least one previous contactor disconnection or connection;
determining a contactor initiation time based on at least one delay time and an alternating current (AC) waveform of the power supply, such that an expiration of the total contactor time delay coincides with the zero-crossing voltage of the AC waveform; and
initiating, by the controller module, a toggling of the power supply by the contactor at the contactor initiation time.

12. The method of claim 11, wherein the at least two operational characteristics of the contactor include at least two of an electrical signal representative of the AC waveform, a temperature value of a contactor coil energizable to disconnect the power supply from an electrical load, the temperature value representative of the temperature of the contactor coil and of a coil temperature delay time, or a contactor coil operational characteristic representative of a contactor coil operational characteristic delay time.

13. The method of claim 11 wherein the initiating further includes energizing the contactor coil with the contactor coil energizing supply at the contactor initiation time, and wherein an effective toggling of the power supply coincides with the zero-crossing voltage of the AC waveform.

14. The method of claim 11 wherein the determining is further based on predicting the contactor time delay.

15. The method of claim 11 wherein the error correction value is based upon a difference in a voltage measured at an effective disconnecting or connecting of the power supply and a zero value for the voltage.

16. A contactor assembly comprising:
a contactor switch selectably connecting an input with an output;
a contactor coil operably coupled to the contactor switch and configured to actuate the contactor switch;
at least two sensors configured to measure an operational characteristic of the contactor assembly comprising a contactor coil temperature sensor configured to measure a temperature of the contactor coil and a contactor coil energizing supply sensor configured to measure a contactor coil energizing supply characteristic; and
a controller module configured to:
receive at least two electrical signals from the at least two sensors, with each electrical signal representative of a delay time;
determine a contactor time delay as a summation of a set of delay timings based upon the at least two electrical signals comprising at least two of:
the temperature of the contactor coil;
the contactor coil energizing supply characteristic; or
an error correction value signal defined by a difference between an effective toggling of a power supply by the contactor along an AC waveform and a zero-crossing voltage of the AC waveform of at least one previous contactor disconnection or connection; and
initiate at least one of a disconnecting or connecting of the input and the output by the contactor switch at an initiation time prior to the zero-crossing voltage of an alternating current (AC) waveform of a power supply wherein the initiation time is based upon the contactor time delay.

17. The contactor assembly of claim 16, wherein the at least two sensors further comprise an input AC waveform sensor configured to measure the AC waveform of the power supply from the input.

18. The contactor assembly of claim 17, wherein the contactor coil temperature sensor is representative of a coil temperature delay time, the input AC waveform sensor is representative of an electrical signal delay time, and the contactor coil operational characteristic sensor is representative of an operational characteristic delay time.

19. The contactor assembly of claim 17, wherein one of the at least two sensors comprise an output voltage sensor configured to measure a voltage when the input is at least one of effectively disconnected or effectively connected from the output, wherein the controller module is configured to receive a fourth electrical signal from the output voltage sensor.

20. The contactor assembly of claim 16 wherein the controller module is further configured to at least one of effectively disconnect or effectively connect the input and the output when the AC waveform has a zero voltage.

* * * * *